US011687279B2

(12) United States Patent
Mehra

(10) Patent No.: US 11,687,279 B2
(45) Date of Patent: Jun. 27, 2023

(54) LATENCY AND THROUGHPUT CENTRIC RECONFIGURABLE STORAGE DEVICE

(71) Applicant: Samsung Electronics Co., Ltd., Suwon-si (KR)

(72) Inventor: Pankaj Mehra, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 29 days.

(21) Appl. No.: 16/826,016

(22) Filed: Mar. 20, 2020

(65) Prior Publication Data

US 2021/0232339 A1   Jul. 29, 2021

Related U.S. Application Data

(60) Provisional application No. 62/966,443, filed on Jan. 27, 2020.

(51) Int. Cl.
*G06F 12/00* (2006.01)
*G06F 3/06* (2006.01)

(52) U.S. Cl.
CPC ............ *G06F 3/0659* (2013.01); *G06F 3/068* (2013.01); *G06F 3/0611* (2013.01); *G06F 3/0613* (2013.01); *G06F 3/0656* (2013.01)

(58) Field of Classification Search
CPC .... G06F 3/0659; G06F 3/0611; G06F 3/0613; G06F 3/0656; G06F 3/068
See application file for complete search history.

(56) References Cited

U.S. PATENT DOCUMENTS

| 6,678,646 | B1 * | 1/2004 | McConnell | G06F 30/39 703/22 |
| 7,941,777 | B1 * | 5/2011 | Young | G06F 30/34 716/126 |
| 9,864,828 | B1 * | 1/2018 | Puthana | G06F 30/331 |
| 2007/0283311 | A1 * | 12/2007 | Karoubalis | G06F 30/34 326/38 |
| 2008/0071910 | A1 * | 3/2008 | Thukral | H04L 65/80 709/226 |

(Continued)

FOREIGN PATENT DOCUMENTS

CN   110209627 A   9/2019

OTHER PUBLICATIONS

Nguyen, Marie, et al., "Do More with FPGAs in Computing: Architecture, Runtime and Applications," JUMP, CONIX Research Center, 2019, 19 pages.

*Primary Examiner* — David Yi
*Assistant Examiner* — Tahilba O Puche
(74) *Attorney, Agent, or Firm* — Lewis Roca Rothgerber Christie LLP

(57) ABSTRACT

A storage device includes: a storage controller to receive data from a host device, and to store the data in storage memory; and a reconfigurable integrated circuit communicably connected to the storage controller, and to accelerate logic operations executed on the data stored in the storage memory, the reconfigurable integrated circuit including: a first logic block to execute a static logic operation from among the logic operations; a second logic block to execute one or more dynamic logic operations from among the logic operations; and a plurality of memory buffers configured to store inputs and outputs of the first and second logic blocks.

20 Claims, 7 Drawing Sheets

(56) References Cited

U.S. PATENT DOCUMENTS

| | | | |
|---|---|---|---|
| 2009/0070728 A1* | 3/2009 | Solomon | G06F 30/30 716/128 |
| 2011/0264888 A1* | 10/2011 | Dasu | G06F 15/8046 712/15 |
| 2014/0165021 A1* | 6/2014 | Pattichis | H03H 17/06 716/135 |
| 2016/0321113 A1* | 11/2016 | Pinto | G06F 9/4856 |
| 2016/0323143 A1* | 11/2016 | Kim | G06F 3/0629 |
| 2017/0123394 A1* | 5/2017 | Oliverio | G06F 15/7871 |
| 2017/0270417 A1* | 9/2017 | Watanabe | G06F 15/7867 |
| 2018/0088622 A1* | 3/2018 | Leong | G06F 5/12 |
| 2018/0088834 A1 | 3/2018 | Sundaram et al. | |
| 2018/0095670 A1* | 4/2018 | Davis | G06F 3/0644 |
| 2018/0285295 A1* | 10/2018 | Abel | G06F 13/4068 |
| 2019/0042146 A1 | 2/2019 | Wysoczanski et al. | |
| 2019/0107956 A1 | 4/2019 | Kachare et al. | |
| 2019/0130291 A1* | 5/2019 | Nicol | G06N 3/105 |
| 2019/0235779 A1 | 8/2019 | Li | |
| 2019/0278482 A1* | 9/2019 | Dubeyko | G06F 3/0659 |
| 2020/0241899 A1* | 7/2020 | Al-Aghbari | G06F 30/34 |
| 2021/0042252 A1* | 2/2021 | Thyamagondlu | H03K 19/17756 |

\* cited by examiner

| Input GB/s | IP | K LUT# |
|---|---|---|
| 3.2 | Parsing stored data format | 25 |
| 3.2 | Decompression | 12 |
| 6.4 | Filtering (90% data filtered out for illustration) | 90 |
| 0.64 | Optional Sorting | 100 |
| 0.64 | Group-Aggregate (Data organized into 10 groups for illustration) | 100 |
| | Total LUT# if simultaneously fitting all IPs | 327 |
| | Maximum Available LUT# on small FPGA | 300 |

FIG. 5A

| Input GB/s | IP | K LUT# |
|---|---|---|
| 3.2 | Parsing stored data format | 25 |
| 3.2 | Decompression | 12 |
| 6.4 | Filtering (90% data filtered out for illustration) | 90 |
| 0.64 | Optional Sorting | 100 |
| 0.64 | Group-Aggregate (Data organized into 10 groups for illustration) | 100 |
| | Max LUT# if IPs loaded only as needed | 127+100 |
| | Maximum Available LUT# on small FPGA | 300 |

FIG. 5B

LATENCY AND THROUGHPUT CENTRIC RECONFIGURABLE STORAGE DEVICE

CROSS-REFERENCE TO RELATED APPLICATION(S)

This application claims priority to and the benefit of U.S. Provisional Application No. 62/966,443, filed on Jan. 27, 2020, entitled "LATENCY AND THROUGHPUT CENTRIC RECONFIGURABLE STORAGE DEVICES," the entire content of which is incorporated by reference herein.

FIELD

Aspects of one or more example embodiments of the present disclosure relate to storage devices, and more particularly, to a storage device for near-storage acceleration of latency-critical and throughput-oriented data-intensive operations.

BACKGROUND

A storage system generally includes a host device and one or more storage devices. Such storage devices include, for example, magnetic storage devices (e.g., hard disk drives (HDD), and the like), optical storage devices (e.g., Blue-ray disc drives, compact disc (CD) drives, digital versatile disc (DVD) drives, and the like), flash memory devices (e.g., USB flash drives, solid-state drives (SSD), and the like), and/or the like. Generally, in order to process data stored in the storage device, the host device first reads the data from the storage device, such that the data is transferred from the storage device into the main memory of the host device. The host device (e.g., a host device including a host processor, such as a central processing unit (CPU)) may then process the data transferred from the storage device into the main memory of the host device.

For example, in the context of a database management system, the host device may output a response to an input database query by performing various data-intensive operations on the data stored in the storage device. As an illustrative example, the host device may perform various operations (e.g., filtering, sorting, grouping, aggregating, and/or the like) on a table of data elements stored in the storage device by first reading the data elements from the storage device and then processing the data elements in order to identify and output a subset of data elements from the table corresponding to the input database query. Such operations may be data-intensive, because they may require a large amount of data (e.g., the table of data elements) to be transferred from the storage device to the host device in order to be processed by the host device. When data-intensive operations are handled by the host device such that a large amount of data is transferred between the storage device and the host device in order to be processed, resources of the host device (e.g., CPU usage, bandwidth, and/or the like) may be over-utilized, latencies may be introduced, and performance of the storage system may be degraded.

Accordingly, a storage device for accelerating data-intensive operations closer to storage may be desired.

The above information disclosed in this Background section is for enhancement of understanding of the background of the present disclosure, and therefore, it may contain information that does not constitute prior art.

SUMMARY

One or more example embodiments of the present disclosure are directed to a storage device for near-storage acceleration of latency-critical and throughput-oriented data-intensive operations, and a method including the same.

According to one or more example embodiments of the present disclosure, a storage device includes: a storage controller configured to receive data from a host device, and to store the data in storage memory; and a reconfigurable integrated circuit communicably connected to the storage controller, and configured to accelerate logic operations executed on the data stored in the storage memory, the reconfigurable integrated circuit including: a first logic block configured to execute a static logic operation from among the logic operations; a second logic block configured to execute one or more dynamic logic operations from among the logic operations; and a plurality of memory buffers configured to store inputs and outputs of the first and second logic blocks.

In an example embodiment, the logic operations may correspond to a pipeline workflow, the first logic block may be configured to be statically configured with the static logic operation for the pipeline workflow, and the second logic block may be configured to be dynamically reconfigured with the one or more dynamic logic operations for at least one stage of the pipeline workflow.

In an example embodiment, the one or more dynamic logic operations may include a first dynamic logic operation and a second dynamic logic operation, the second logic block may be configured with the first dynamic logic operation during a first stage of the pipeline workflow, and the second logic block may be dynamically reconfigured with the second dynamic logic operation during a second stage of the pipeline workflow.

In an example embodiment, the plurality of memory buffers may include: an input/output (I/O) buffer configured to store the inputs and the outputs of the first and second logic blocks; an intermediate I/O buffer configured to store intermediate outputs of the second logic block while the second logic block is being reconfigured; and a configuration buffer configured to store configuration files to reconfigure the second logic block.

In an example embodiment, the second logic block may be dynamically reconfigured by loading a configuration file from among the configuration files stored in the configuration buffer to the second logic block.

In an example embodiment, outputs of the second logic block may be stored in the intermediate I/O buffer during a first stage, the second logic block may be reconfigured with a different dynamic logic instruction for a second stage, and the intermediate I/O buffer may be designated as the input buffer of the second logic block during the second stage.

In an example embodiment, the static logic operation may correspond to a latency-critical operation, and the one or more dynamic logic operations may correspond to a throughput-oriented operation.

In an example embodiment, the latency-critical operation may be an operation having a completion time that is less than a reconfiguration time of the second logic block.

In an example embodiment, the storage device may be a solid-state drive.

In an example embodiment, the reconfigurable integrated circuit may be a field programmable gate array (FPGA).

According to one or more example embodiments of the present disclosure, a method for accelerating operations in a storage device comprising a storage controller, storage memory, and a reconfigurable integrated circuit comprising a first logic block, a second logic block, and a buffer, includes: executing, by the first logic block, a first logic operation on input data stored in the storage memory;

storing, by the first logic block, outputs of the first logic operation in an intermediate output buffer of the buffer; configuring, by the reconfigurable integrated circuit, a second logic operation in the second logic block; designating, by the reconfigurable integrated circuit, the intermediate output buffer as an input buffer for the second logic operation; and executing, by the second logic block, the second logic operation on the outputs of the first logic operation stored in the intermediate output buffer.

In an example embodiment, the second logic operation may be configured in the second logic block while the first logic operation is executing in the first logic block.

In an example embodiment, the configuring of the second logic operation in the second logic block may include: monitoring a value of the intermediate output buffer; determining that the value exceeds a threshold value; and configuring the second logic operation in the second logic block in response to the value exceeding the threshold value.

In an example embodiment, the threshold value may be a high water mark of the intermediate output buffer.

In an example embodiment, the buffer may include a configuration buffer configured to store configuration files for configuring the second logic block.

In an example embodiment, the configuring of the second logic operation in the second logic block may include: loading a bit file corresponding to the second logic operation from among the configuration files stored in the configuration buffer into the second logic block.

In an example embodiment, the designating of the intermediate output buffer as the input buffer for the second logic operation may include: determining whether the first logic operation is suspended; designating the intermediate output buffer as the input buffer for the second logic operation in response to determining that the first logic operation is suspended; and designating an input buffer of the first logic operation as an output buffer for the second logic operation.

In an example embodiment, the determining whether the first logic operation is suspended may include: determining whether an end of the intermediate output buffer is reached.

In an example embodiment, the method may further include: determining that the second logic block has processed all of the outputs of the first logic operation stored in the intermediate output buffer; and designating an output buffer of the second logic operation as a final output buffer.

In an example embodiment, the storage device may be a solid state drive, and the reconfigurable integrated circuit may be a field programmable gate array (FPGA).

BRIEF DESCRIPTION OF THE DRAWINGS

The above and other aspects and features of the present disclosure will become more apparent to those skilled in the art from the following detailed description of the example embodiments with reference to the accompanying drawings.

FIG. 5A illustrates a comparative example of statically configuring a storage device with the operations associated with the pipeline workflow of FIG. 4.

FIG. 5B is an illustrative example of configuring the storage device in accordance with one or more embodiments of the present disclosure with the operations associated with the pipeline workflow of FIG. 4.

DETAILED DESCRIPTION

Figure 1:
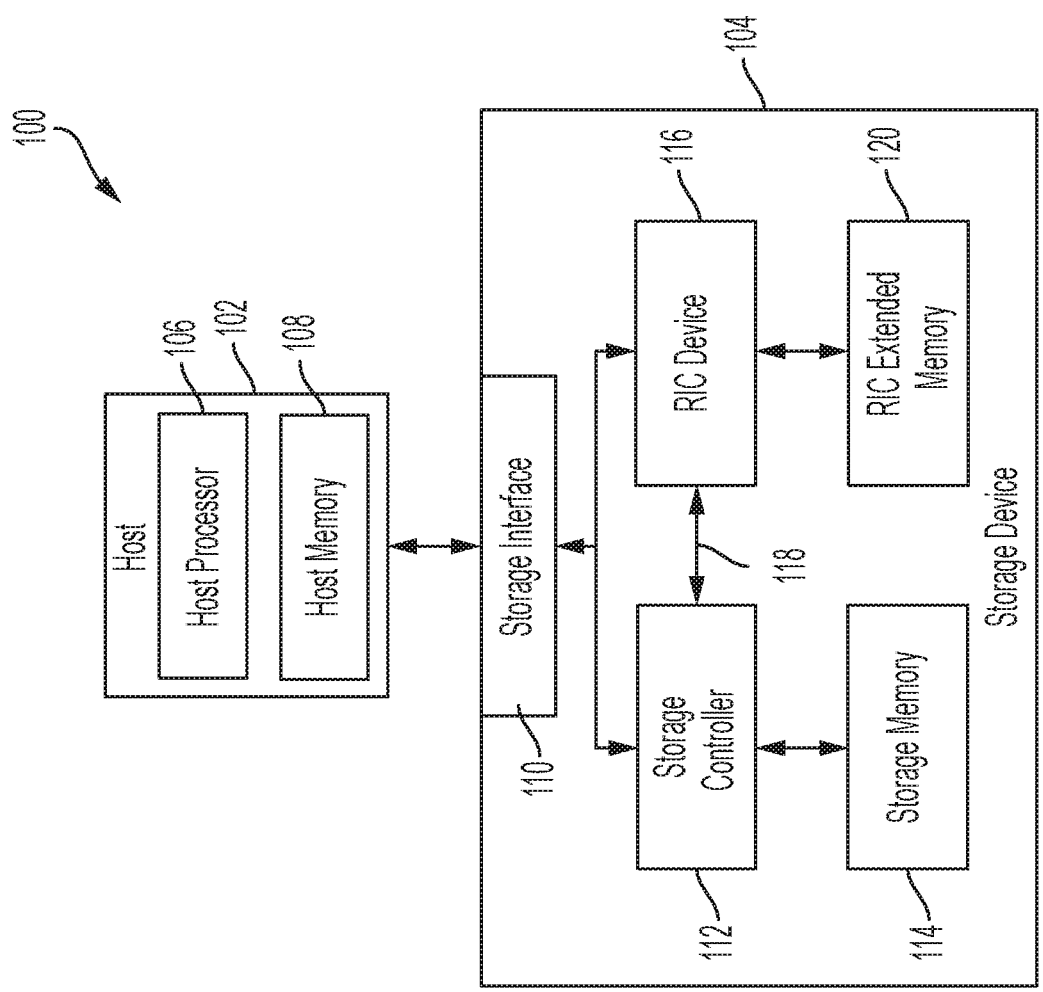
FIG. 1 is a system diagram of a storage system, according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

One or more example embodiments of the present disclosure are directed to a storage device for accelerating data-intensive operations of a host device closer to storage (e.g., near storage or in-storage). For example, the host device may off-load the data-intensive operations to the storage device, such that the storage device processes data stored therein according to the data-intensive operations. In this case, in some embodiments, the storage device may process raw data stored therein to output a reduced amount of data, and may transfer the reduced amount of data to the host device, instead of transferring the raw data (e.g., an entirety of the raw data) to be processed by the host device. Thus, rather than having the host device read data from the storage device and process the freshly fetched data, a bulk of the operations that would otherwise be performed on the freshly fetched data by the host device may be off-loaded to the storage device, such that the resources of the host device (e.g., CPU usage, bandwidth, and/or the like) may be used, for example, for cross-device operations (e.g., such as joining information from tables stored in multiple storage devices). Accordingly, performance of the storage system may be improved, for example, by reducing the amount of traffic between the host device and the storage device.

In some embodiments, when the data-intensive operations are off-loaded to the storage device, scalability of the storage device may be improved, for example, by reducing resources of the host device that would otherwise be used to process the fetched data stored in the storage device. For example, when the host device handles the data-intensive operations, the host device may become a bottleneck to efficient scalability. As an illustrative example, a scale-out cluster used in modern data processing systems may generally use a server including one or two low to moderate core count CPUs that may handle processing of data from 4 to 8 SSDs before reaching a maximum limit on its interfaces. In this case, to scale storage of such data processing systems, additional servers may generally be added to the scale-out cluster in order to handle additional processing of data from additional SSDs, rather than scaling the number of SSDs that the core CPUs of existing servers in the cluster may handle. On the other hand, the storage device, according to one or more example embodiments, may accelerate the data-intensive operations of the host device, such that each server may handle more data. For example, if the data is first filtered by the storage device, such that the smallest filtered table is transmitted to the host device to join with information from other tables (e.g., stored on the same or other storage devices within a server), then the overall performance of a given decision support benchmark may be improved without requiring additional servers in the cluster.

In some embodiments, the storage device may be, at least partially, dynamically (e.g., in real-time or near real-time) reconfigurable (e.g., reprogrammable) to process the data stored therein. For example, in some embodiments, the storage device may include a plurality of logic blocks that are configured to execute the data-intensive operations that are off-loaded to the storage device. In some embodiments, the logic blocks may include static logic blocks and dynamic logic blocks. The static logic blocks may correspond to logic blocks that are statically configured in the storage device for at least an entirety of a pipeline workflow. The dynamic logic blocks may correspond to logic blocks that may be dynamically reconfigured as needed or desired for one or more stages of the pipeline workflow. As used herein, a pipeline workflow refers to a series of operations (e.g., processes) performed (e.g., concurrently and/or sequentially) on data in stages, such that the data read from the storage device may be an input to a first operation of a first stage of the pipeline workflow, an output of the first operation of the first stage may be an input to a second operation of a second stage of the pipeline workflow, and so on, until an output of a final operation of a final stage of the pipeline workflow is a final result of the series of operations.

In some embodiments, the operations corresponding to a given pipeline workflow may include one or more operations that are latency-critical operations and/or one or more operations that are throughput-oriented operations. As used herein, latency-critical operations can refer to operations that seek to optimize or reduce the time it takes from the beginning of a read operation on the data to the end of the operation performed on the read data, whereas throughput-oriented operations can refer to operations that seek to optimize or increase a rate parameter, for example, such as the number of operations performed per unit time or the amount of data processed per unit time, but not necessarily the latency of any one operation. In this case, the latency-critical operations (which may not be able to tolerate the time it takes to reconfigure the storage device) may correspond to the static logic blocks, and the throughput-oriented operations (which may be able to tolerate the time it takes to reconfigure the storage device) may correspond to the dynamic logic blocks.

For example, in some embodiments, reconfiguring the dynamic logic blocks may require a reconfiguration time (e.g., about 1 milli-second (ms)), whereas user requirements (e.g., service level agreements (SLAs)) may require certain latency-critical operations to be performed in less time (e.g., about 25 micro-seconds (μs)) as compared with the reconfiguration time. In this case, the latency-critical operations may be unable to tolerate the time it takes to reconfigure the dynamic logic blocks (e.g., may be an operation having a completion time that is less than a reconfiguration time), and thus, the latency-critical operations may be configured in the static logic blocks. On the other hand, when the storage device includes only the static logic blocks, the operations that may be off-loaded to the storage device may be limited according to the fixed resources of the storage device. For example, in this case, the data-intensive operations may be configured concurrently (e.g., simultaneously or at the same time) on the storage device, and thus, the amount of data processed and/or the type of operations that may be configured concurrently on the storage device may be limited to the fixed resources of the storage device.

In some embodiments, the storage device may be configured (e.g., reconfigured or reprogrammed) as needed or desired at start-time and/or at runtime (e.g., in real-time or near real-time) according to various user requirements (e.g., service level agreements (SLAs) and/or the like), available resources of the storage device (e.g., available memory, available look-up table (LUT) count, and/or the like), pipeline workflows, acceleration performance, data size, selectivity of data reduction operations, and/or the like. For example, in some embodiments, the latency-critical and/or throughput-centric operations may be configured in the static and dynamic logic blocks as needed or desired considering the SLAs (e.g., operations deemed latency-critical), a reconfiguration time of the logic blocks, available resources of the storage device (e.g., the reconfigurable integrated circuit thereof), pipeline workflows, and/or the like. In another example, the storage device may operate in various modes according to an acceleration performance and/or selectivity of data reduction operations thereof. For example, in some embodiments, if the data-intensive operations that are offloaded to the storage device do not reduce the size of the data that is ultimately returned to the host device, then the data-intensive operations that were off-loaded to the storage device may be performed by the host device instead, such that the storage device is dynamically reconfigured to operate in a normal mode (e.g., a mode where the data is read and processed by the host device instead of being offloaded to the storage device).

These and other aspects and features of the present disclosure will be described in more detail hereinafter with reference to the accompanying figures.

FIG. 1 is a system diagram of a storage system, according to one or more example embodiments of the present disclosure.

In brief overview, the storage system 100 according to one or more embodiments of the present disclosure may include a host device (e.g., a host computer) 102 and a storage device 104. The host device 102 may off-load various data-intensive operations to the storage device 104, such that the storage device 104 accelerates the data-intensive operations of the host device 102. For example, the host device 102 may be communicably connected to the storage device 104, and may transfer data to the storage device 104 to store data in the storage device 104. The host device 102 may transmit various commands to the storage device 104, such that the storage device 104 processes the data stored therein according to the commands, rather than transmitting an entirety of the data to a host memory (e.g., a main memory) 108 to be processed by a host processor (e.g., a CPU) 106. For example, rather than transmitting a large amount of raw data stored in the storage device 104 to the host memory 108 to be mostly filtered out by the host processor 106, the storage device 104 may process the raw data stored therein to output a reduced amount of processed data (e.g., a sub-set of the raw data) to the host device 104 in response to the commands. Accordingly, a bulk of the operations performed on freshly fetched data may be off-loaded to the storage device 104 to be performed closer to storage (e.g., near storage or in-storage), such that resources of the host device 102 (e.g., CPU usage, I/O bus bandwidth, CPU cache capacity, cache to memory bandwidth, memory capacity, and/or the like) may be used for other operations, for example, such as in-memory operations and cross-device operations (e.g., joining data stored on a plurality of storage devices).

In more detail, referring to FIG. 1, the host device 102 may include the host processor 106 and the host memory 108. The host processor 106 may be a general purpose processor, for example, such as a CPU core of the host device 102. The host memory 108 may be considered as high performing main memory (e.g., primary memory) of the host device 102. For example, in some embodiments, the host memory 108 may include (or may be) volatile memory, for example, such as dynamic random-access memory (DRAM). However, the present disclosure is not limited thereto, and the host memory 108 may include (or may be) any suitable high performing main memory (e.g., primary memory) replacement for the host device 102 as would be known to those skilled in the art. For example, in other embodiments, the host memory 108 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM) and can include, for example, chalcogenides, and/or the like.

The storage device 104 may be considered as secondary memory that may persistently store data accessible by the host device 102. In this context, the storage device 104 may include (or may be) relatively slower memory when compared to the high performing memory of the host memory 108. For example, in some embodiments, the storage device 104 may be secondary memory of the host device 102, for example, such as an SSD. However, the present disclosure is not limited thereto, and in other embodiments, the storage device 104 may include (or may be) any suitable storage device, for example, such as an HDD, a USB flash drive, a Blue-ray disc drive, and/or the like. In some embodiments, the storage device 104 may conform to a large form factor standard (e.g., a 3.5 inch hard drive form-factor), a small form factor standard (e.g., a 2.5 inch hard drive form-factor), an M.2 form factor, and/or the like. In other embodiments, the storage device 104 may conform to any suitable or desired derivative of these form factors.

In some embodiments, the storage device 104 may include a storage interface 110, a storage controller 112, storage memory 114, a reprogrammable integrated circuit (RIC) device 116, a direct (or a private) interconnect 118 between the storage controller 112 and the RIC device 116, and RIC extended memory 120. The storage interface 110 may facilitate communications (e.g., using a connector and a protocol) between the host device 102 and the storage device 104. For example, in some embodiments, the storage interface 110 may expose to the host device 102, data communications with the storage controller 112 and/or the RIC device 116. In some embodiments, the storage interface 110 may facilitate the exchange of storage requests and responses between the host device 102 and the storage device 104. In some embodiments, the storage interface 110 may facilitate data transfers by the storage device 104 to and from the host memory 108 of the host device 102. For example, in some embodiments, the storage interface 110 (e.g., the connector and the protocol thereof) may include (or may conform to) Peripheral Component Interconnect Express (PCIe), remote direct memory access (RDMA) over Ethernet, Serial Advanced Technology Attachment (SATA), Fiber Channel, Serial Attached SCSI (SAS), Non Volatile Memory Express (NVMe), and/or the like. In other embodiments, the storage interface 110 (e.g., the connector and the protocol thereof) may include (or may conform to) various general-purpose interfaces, for example, such as Ethernet, Universal Serial Bus (USB), and/or the like. In yet other embodiments, the storage interface 110 may support additional acceleration or coherence protocol, such as CCIX, CAPI, OpenCAPI, nvLink, or CXL, on top of its own connector and associated protocol (such as PCIe or Ethernet).

The storage controller 112 is connected to the storage interface 110, and responds to input/output (I/O) requests received from the host device 102 through the storage interface 110. The storage controller 112 may provide an interface to control, and to provide access to and from, the storage memory 114. For example, the storage controller 112 may include at least one processing circuit embedded thereon for interfacing with the host device 102 and the storage memory 114. The processing circuit may include, for example, a digital circuit (e.g., a microcontroller, a microprocessor, a digital signal processor, a field programmable gate array (FPGA), an application-specific integrated circuit (ASIC), and/or the like) capable of executing data access instructions to provide access to and from the data stored in the storage memory 114 according to the data access instructions. For example, the data access instructions may include any suitable data storage and retrieval algorithm (e.g., read/write) instructions, encryption/decryption algorithm instructions, compression algorithm instructions, and/or the like. The storage memory 114 may persistently store the data received from the host device 102. For example, in the context of a database management system, the storage memory 114 may store the data in any suitable self-describing columnar format, for example, such as AVRO, ORC, PARQUET, and/or the like. However, the present disclosure is not limited thereto, and the storage memory 114 may store the data in any suitable format according to the application of the storage system 100. For example, in the context of a media system, the storage memory 114 may store the data in any suitable media format, for example, such as H.264, H.265, MPEG, AVI, and/or the like. In some embodiments, the storage memory 114 may store the data received from the host device 102 in an encrypted and/or compressed format. The storage memory 114 may include non-volatile memory, for example, such as NAND flash memory. However, the present disclosure is not limited thereto, and the storage memory 114 may include any suitable memory depending on a type of the storage device 104, such as phase change memory, magnetic memory, ferroelectric memory, and/or the like.

The RIC device 116 may process the data stored on the storage memory 114 according to the commands from the host device 102. For example, in some embodiments, the RIC device 116 may be communicably connected to the storage controller 112 (e.g., via the direct interconnect 118) to access (e.g., to read) the data stored on the storage memory 114, and may process (e.g., may reduce, filter, sort, group, aggregate, deduplicate, and/or the like) the read data such that a reduced amount of processed data (e.g., a sub-set of the retrieved data stored in the storage memory 114) is transmitted to the host device 104. In this case, the RIC device 116 may include a plurality of logic blocks having various suitable configurations to process the data stored in the storage memory 114 according to the commands from the host device 102. As used herein, a logic block can include a logic component of the RIC device 116, and may include gates and flip-flops with the connections therebetween being configured (e.g., as defined in look-up tables (LUTs) in the case of some field programmable gate arrays (FPGAs)) to perform various logic operations (e.g., filter, sort, aggregate, deduplicate, and/or the like). Because the RIC device 116 may include the logic blocks to execute various operations on the freshly fetched data instead of the host device 102, resource utilization (e.g., CPU usage, PCI bandwidth, and/or the like) of the host device 102 may be reduced.

Accordingly, the RIC device 116 may be considered as a separate and distinct processor from that of the host device 102 (e.g., from the host processor 106). For example, in some embodiments, the RIC device 116 may be implemented as an integrated circuit (IC). In some embodiments, the RIC device 106 may be implemented on the storage device 104 (e.g., may be embedded on the same board or the same circuit board as that of the storage device 104). For example, the RIC device 116 may be implemented on (e.g., may be attached to or mounted on) the storage device 104 as a system on chip (SOC). In this case, because the RIC device 116 may be implemented on the storage device 104, the data stored in the storage device 104 may be processed closer to the storage memory 114. Accordingly, latencies that may be caused when transferring the data stored in the storage memory 114 over long distances and/or over external interfaces may be reduced or minimized. The storage system 100 may additionally benefit from the extra internal data transfer bandwidth between RIC device 116 and Storage Controller 112 introduced by each additional storage device 104. Accordingly, net data transfer throughput of storage system 100 is no longer constrained by Host to Storage Interface. However, the present disclosure is not limited thereto, and in other embodiments, the RIC device 106 may be implemented on a separate board (e.g., a separate circuit board) from that of the storage device 104 and may be communicably connected to the storage device 104. In some embodiments, the RIC device 116 may include (or may be) a Field Programmable Gate Array (FPGA) configured to support dynamic partial reconfiguration (DPR), such that at least a portion thereof is dynamically reconfigurable as needed or desired, but the present disclosure is not limited thereto. For example, in other embodiments, the RIC device 116 may include (or may be) an Application Specific Integrated Circuit (ASIC), a Graphical Processing Unit (GPU), a Complex Programmable Logic Device (CPLD), a Coarse-Grained Reconfigurable Array (CGRA), and/or the like.

In some embodiments, the RIC device 116 may be considered as a supplemental processor of the storage device 102 that is separate and distinct from the storage controller 112. For example, in some embodiments, unlike the storage controller 112, which may not be easily reprogrammable, the RIC device 116 may support DPR in which the RIC device 116 may be at least partially dynamically reconfigurable (e.g., dynamically reprogrammable) as needed or desired depending on the commands from the host device 102. However, the present disclosure is not limited thereto, and in other embodiments, the RIC device 116 may be implemented as part of the storage controller 112, for example, when all or part of the storage controller 112 is reprogrammable (e.g., configured to support DPR). As will be described in more detail below with reference to FIG. 2, in some embodiments, the RIC device 116 may include static logic blocks and dynamically reconfigurable logic blocks (e.g., dynamic logic blocks) to perform various operations on the data stored in the storage memory 114 according to the commands from the host device 102.

Still referring to FIG. 1, in some embodiments, the RIC device 116 may be communicably connected to the storage controller 116 via the direct (or the private) interconnect 118. For example, in some embodiments, the RIC device 116 may read the data stored in the storage memory 114 by directly communicating with the storage controller 112 via the direct interconnect 118 using peer-to-peer (P2P) communications without involving the host device 102. For example, instead of first loading the data from the storage memory 114 to the host memory 108, and then sending the data to the RIC device 116 for further processing, the RIC device 116 may directly communicate with the storage controller 112 to access or receive the data from the storage memory 114 without involving the host device 102. P2P communications between the RIC device 116 and the storage controller 112 via the direct interconnect 118 may further reduce or eliminate overhead of reading/writing from the host memory 108, and may reduce operational latency that may be caused when communicating data via the host device 102. The data transfer bandwidth of each direct interconnect 118 adds to overall data transfer throughput of storage system 100 in proportion to the amount of data in the storage memories 114 even as additional storage devices 104 are placed in the storage system 100. Such scalability benefit of the present disclosure allows storage system 100 to scale up to hold much more data without loss of performance per unit of storage memory capacity than comparative systems. After processing the data by the RIC device 116, the processed data may be provided to the host device 102. By virtue of the processed data either being rendered smaller through filtering operation performed by RIC device 116, or easier to process by host through reformatting operation performed by RIC device 116, or more suitable for viewing by a client of storage system 100 through transcoding operation performed by RIC device 116, for instance, additional performance and utility benefits accrue to the consumer of functions realized by storage system 100 due to incorporation of processing capability of RIC device 116 inside storage device 104, but the present disclosure is not limited thereto.

The RIC extended memory 120 may be communicably connected to the RIC device 116, and may be implemented on the storage device 104 as a memory chip (e.g., as a dynamic random-access memory (DRAM) chip) connected to a channel (e.g., double data rate (DDR) memory interface) of the RIC device 116. For example, in some embodiments, the RIC extended memory 120 may be embedded on the storage device 104 as a plurality of memory devices (e.g., a plurality of DRAM memory chips) connected to a DDR port of the RIC device 116. As used herein, a "memory device" refers to the smallest functional replaceable unit of memory capable of storing data. For example, a DRAM memory device may contain thirty six billion bits of data, each bit realized by a capacitor for storing an electric charge, and a transistor for selectively charging the capacitor with the one bit of data. However, the present disclosure is not limited thereto, and the RIC extended memory 120 may include any suitable type of memory to extend the main memory (e.g., the internal memory) of the RIC device 116. For example, in other embodiments, RIC extended memory 120 may include (or may be) any suitable volatile memory or non-volatile memory as would be known to those skilled in the art, such as SRAM, MRAM, NAND, Tightly-Coupled Memory (TCM), PCM, Resistive RAM, STTRAM, any suitable memory based on PCM technology, memristor technology, and/or resistive random access memory (ReRAM) and can include, for example, chalcogenides, and/or the like.

In some embodiments, the RIC extended memory 120 may be relatively slower memory when compared to the main memory (e.g., the internal memory) of the RIC device 116 (e.g., see FIG. 2), but may have more capacity (e.g., more storage space) than that of the main on-chip memories of the RIC device 116, such as any Block RAM or Unified RAM in an example embodiment where the RIC device 116 is a Xilinx UltraScale+FPGA. In this case, as discussed in more detail below with reference to FIG. 3, the off-chip RIC extended memory 120 may be used as staging memory in which the RIC extended memory 120 is partitioned to store intermediate inputs/outputs, as well as to store configuration files to dynamically reconfigure the dynamic logic blocks as needed or desired. For example, in some embodiments, the RIC device 116 may include the gates and flip-flops (e.g., the logic blocks), and the functions and/or connections between the gates and/or flip-flops (e.g., the LUTs in the case of an FPGA) may be configured by loading configuration data (e.g., an object file, or a bit file in the case of an FPGA) into the RIC device 116, which may be referred to hereinafter as a configuration file, that is stored in the RIC extended memory 120 to be quickly retrieved as needed or desired. However, the present disclosure is not limited thereto, and in other embodiments, the RIC extended memory 120 may be omitted, for example, when the main memory of the RIC device 116 has sufficient capacity to perform the functions of the RIC extended memory 120 described herein (e.g., sufficient capacity to be partitioned for the intermediate staging memory).

Figure 2:
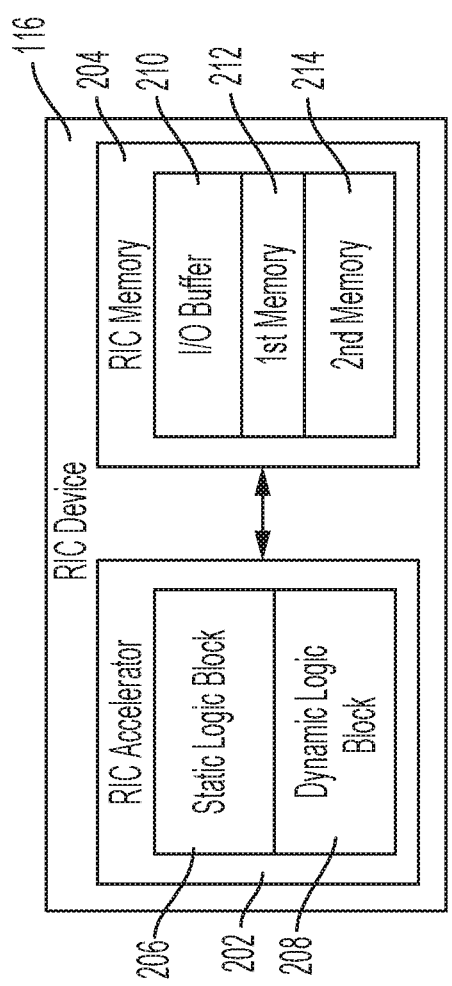
FIG. 2 is a block diagram illustrating a reconfigurable processing device of a storage device, according to one or more example embodiments of the present disclosure.
Figure 3:
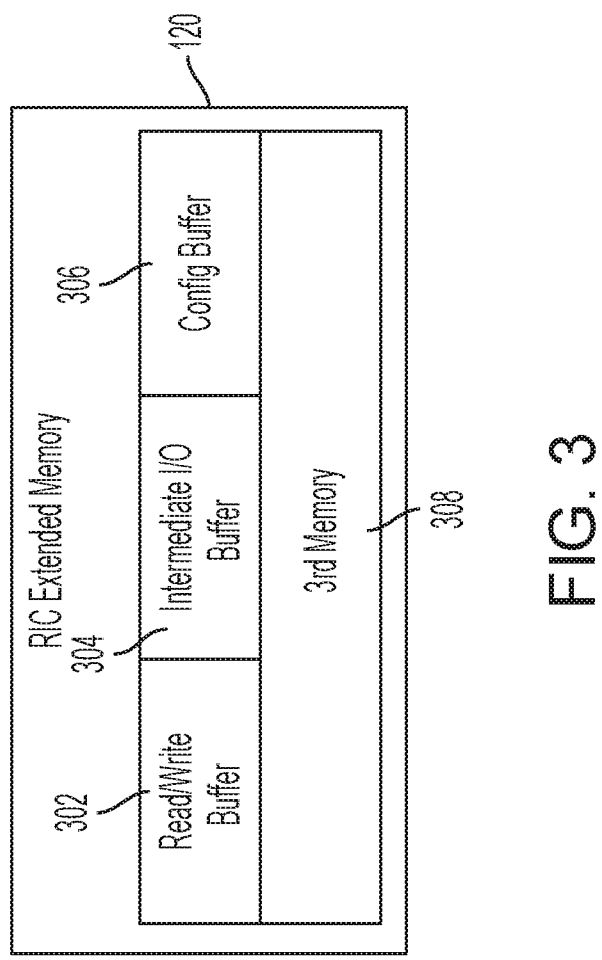
FIG. 3 is a block diagram illustrating extended memory of the reconfigurable processing device of the storage device, according to one or more example embodiments of the present disclosure.

FIG. 2 is a block diagram illustrating the RIC device 116 of FIG. 1 in more detail, according to one or more example embodiments of the present disclosure. FIG. 3 is a block diagram illustrating the RIC extended memory 120 of FIG. 1 in more detail, according to one or more example embodiments of the present disclosure. Hereinafter, for convenience, the RIC device 116 will be described in more detail in the context of an FPGA, but the present disclosure is not limited thereto.

Referring to FIGS. 1 to 3, the RIC device 116 may process the data stored on the storage memory 114 according to commands from the host device 102. For example, in some embodiments, the RIC device 116 may include a RIC accelerator 202 and RIC memory (e.g., main memory or internal memory) 204. In brief overview, the RIC device 116 may receive data from the storage memory 114 over the direct interconnect 118, and may process the read data according to a configuration of the RIC accelerator 202. The inputs/outputs of the data processed by the RIC accelerator 202 may be stored in the RIC memory 204 (and/or the RIC extended memory 120). Once the data is fully processed (e.g., by the RIC accelerator 202), the processed data may be transferred to the host device 102. In some embodiments, the RIC accelerator 202 may be, at least partially, dynamically reconfigured (e.g., in real-time or near real-time) according to the available resources of the RIC device 116, user requirements (e.g., service level agreements (SLAs)), pipeline workflows, size of data transferred between stages, acceleration performance, selectivity of data reduction operations, and/or the like.

For example, the RIC accelerator 202 may include static logic blocks 206 and dynamic logic blocks 208. The static logic blocks 206 may correspond to logic blocks that are configured in the RIC accelerator 202 for at least an entirety of a pipeline workflow, and the dynamic logic blocks 208 may correspond to logic blocks that are dynamically reconfigured as needed or desired for one or more stages corresponding to the pipeline workflow. For example, the pipeline workflow may be divided into a plurality of stages, and each of the stages may include one or more operations that are executed (e.g., concurrently for maximum throughput or least latency, or sequentially for maximum throughput per RIC accelerator resource) on the data (e.g., the data read from the storage memory 118 or output from a previous stage). For each of the stages of the pipeline workflow, the RIC accelerator 202 may maintain the static logic blocks 206 configured therein, but for any particular one or more of the stages, the RIC accelerator 202 may dynamically reconfigure the dynamic logic blocks 208 as needed or desired. For example, as will be discussed in more detail below with reference to FIGS. 4 to 5B, the static logic blocks 206 and the dynamic logic blocks 208 may be configured in the RIC accelerator 202 according to (e.g., depending on) critical latency requirements of the operations and/or the amount of available resources on the RIC accelerator 202 that may be configured concurrently (e.g., simultaneously or at the same time) to handle the operations.

The RIC memory 204 may be considered as the main memory (e.g., may be the internal memory) of the RIC device 116. The RIC memory 204 may include an I/O buffer 210, first memory 212, and second memory 214. The I/O buffer 210 may be partitioned among the first and second memory 212 and 214, and may serve as a buffer for the inputs and outputs of the logic blocks (e.g., the static logic blocks and/or the dynamic logic blocks) executing in the RIC accelerator 202. The RIC extended memory 120 may be extended memory (e.g., may be external memory or secondary memory) of the RIC device 116. In some embodiments, the RIC extended memory 120 may serve as staging memory of the RIC device 116. As shown in FIG. 3, in some embodiments, the RIC extended memory 120 may include a read/write buffer 302, an intermediate I/O buffer 304, a configuration (config) buffer 306, and third memory 308. The read/write buffer 302, the intermediate I/O buffer 304, and the config buffer 306 may be partitioned on the third memory 308.

The read/write buffer 302 may store data that is read from and written to the storage memory 114. The intermediate I/O buffer 304 may serve as an intermediate buffer for the inputs and outputs of the logic blocks between stages of the pipeline workflow. For example, when the dynamic logic blocks are reconfigured between stages of the pipeline workflow, the outputs of the dynamic logic blocks of the previous stage may be stored in the intermediate I/O buffer 304 such that the dynamic logic blocks may be reconfigured for a present stage, and then the intermediate I/O buffer 304 may be designated as the input buffer for the reconfigured dynamic logic blocks for the present stage.

The config buffer 306 may store the configuration files (e.g., object files, or bit files in the case of an FPGA) of various different configurations for the dynamic logic blocks. In this case, the dynamic logic blocks may be reconfigured by loading different configuration files (e.g., corresponding to the desired operations) from the config buffer 306 into the RIC accelerator 202 as needed or desired. When the configuration files are stored in the config buffer 306 of the RIC extended memory 120, reconfiguration time of the dynamic logic blocks may be reduced (e.g., to about 1 ms) when compared to other cases where the configuration files are stored externally and/or provided from another device (e.g., the host device). However, the present disclosure is not limited thereto, and in another embodiment, the config buffer 306 may be omitted. In this case, the configuration files may be stored, for example, in the storage memory 114 or the RIC memory 204, or may be provided from an external device (e.g., the host device and/or the like).

In some embodiments, the first memory 212 may be the fastest available memory of the RIC device 116, but may have low capacity (e.g., low storage space). The second memory 214 may have a higher capacity than that of the first memory 212, but may be slower than the first memory 212. The third memory 308 may have the largest capacity (e.g., the largest storage space), but may be the slowest available memory of the RIC device 116. For example, in the context of an FPGA, the first memory 212 may include Block Random Access Memory (BRAM), the second memory 214 may include Unified Random Access Memory (URAM), and the third memory 308 may include the DRAM. However, the present disclosure is not limited thereto, and in another embodiment, one of the first and second memory 212 and 214 may be omitted, or the first and second memory 212 and 214 may include any suitable type of memory depending on a type of the RIC device 116. For example, in another embodiment, in the context of an FPGA, the second memory 214 (e.g., the URAM) may be omitted. In some embodiments, the third memory 308 may include (e.g., may be) a 4 GB DRAM chip or an 8 GB DRAM chip, but the present disclosure is not limited thereto.

According to an embodiment, the RIC accelerator 202 may store inputs/outputs of the static logic blocks 206 and the dynamic logic blocks 208 in the first, second, and/or third memory 212, 214, and 308 according to a size of the data transferred between stages and/or desired speed of the data. For example, if the amount of data transferred between stages is relatively small, and/or the operations performed by the logic block (e.g., the static logic block 206) of the RIC accelerator 202 is latency-critical, then the inputs/outputs of such logic block may be stored in the first memory 212 or the second memory 214. On the other hand, if the data transferred between stages is relatively large, and/or the operations performed by the logic block (e.g., the dynamic logic block 208) is throughput-oriented, then the inputs/outputs of such logic block may be stored in the third memory 308.

In an embodiment, when the data transferred between stages is relatively large, then the outputs of the operations performed by the logic blocks (e.g., the dynamic logic blocks 208) may be initially stored in the first or second memory 212 and 214, and when the dynamic logic blocks 208 are reconfigured (e.g., between stages), the outputs may be transferred to the third memory 308 (e.g., the intermediate I/O buffer 304) such that the dynamic logic blocks 208 may be reconfigured. The outputs stored in the third memory 308 may then be designated as the input buffer for the reconfigured dynamic logic blocks 208. In this case, the outputs of the reconfigured dynamic logic blocks 208 may be stored in any suitable one of the first, second, and third memory 212, 214, and 308 (e.g., according to speed, data size, and/or the like). In another embodiment, when the data transferred between stages is relatively large, the outputs of the operations performed by the logic blocks (e.g., the dynamic logic blocks 208) may be initially stored in the third memory 308 (e.g., the intermediate I/O buffer 304), and when the dynamic logic blocks 208 are reconfigured, the outputs thereof stored from the previous stage in the third memory 308 may be designated as the inputs of the reconfigured dynamic logic blocks 208 of the current stage. However, the present disclosure is not limited to these examples, and any suitable combinations of the static logic blocks 206 and the dynamic logic blocks 208 may consume any suitable ones of the first, second, and third memory 212, 214, and 308 resources as needed or desired according to the amount of data transferred between stages, the speed of the data desired, and/or the like.

Figure 4:
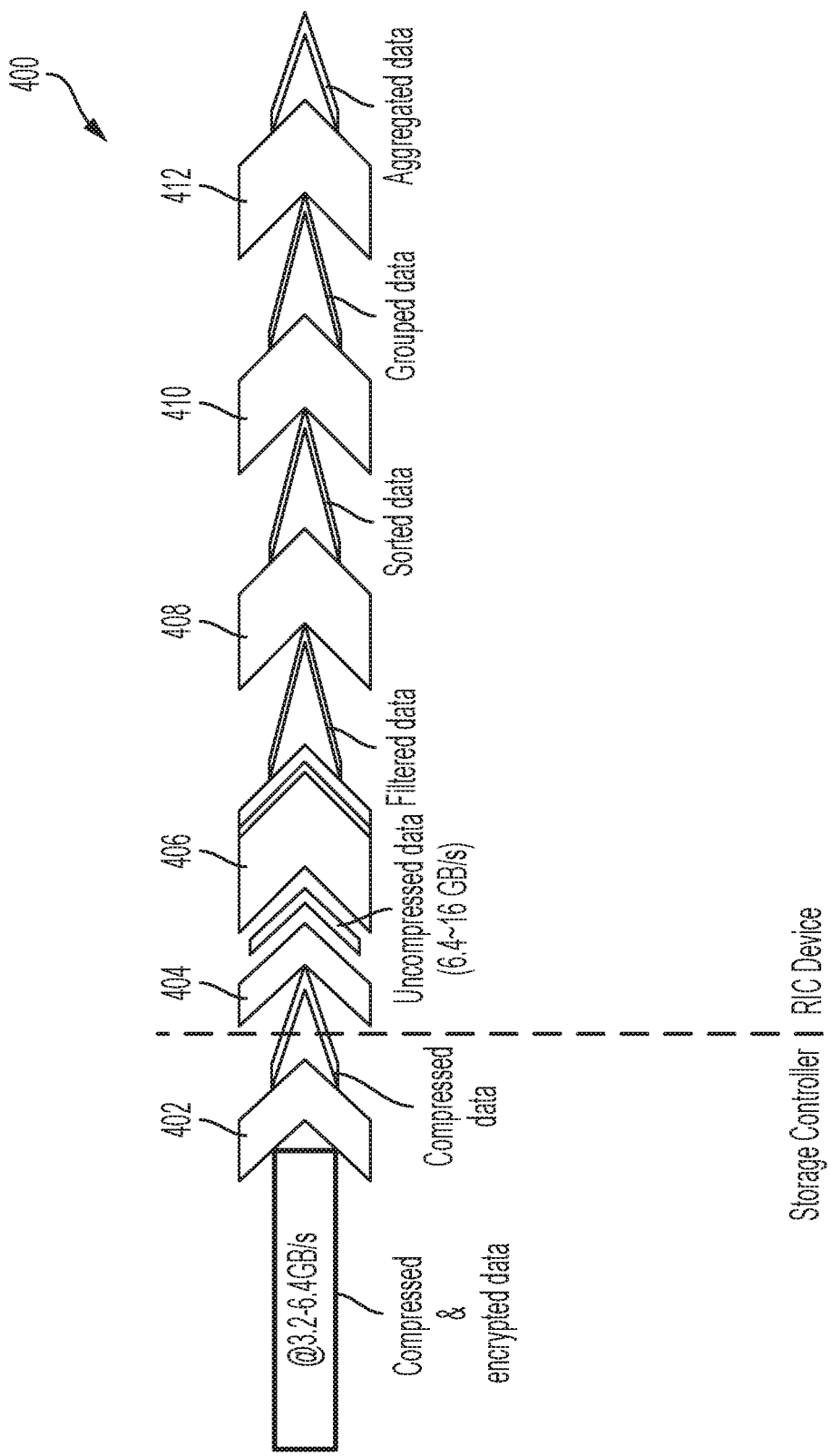
FIG. 4 is an illustrative example of a pipeline workflow, according to one or more example embodiments of the present disclosure.

FIG. 4 is an illustrative example of a pipeline workflow, according to one or more example embodiments of the present disclosure. FIG. 5A illustrates a comparative example of statically configuring a storage device with the operations associated with the pipeline workflow of FIG. 4. FIG. 5B is an illustrative example of configuring the storage device in accordance with one or more embodiments of the present disclosure with the operations associated with the pipeline workflow of FIG. 4. For convenience, the pipeline workflow will be described in the context of an illustrative database query in a database application, but the present disclosure is not limited thereto.

Referring to FIGS. 1 to 5B, a typical pipeline workflow 400 in response to a database query may include a plurality of stages 402 to 412. For example, the stages may include a first stage 402, a second stage 404, a third stage 406, a fourth stage 408, a fifth stage 410, and a sixth stage 412, and each of the stages 402 to 412 may include one or more operations that are performed (e.g., concurrently or sequentially), starting with operations of the first stage 402 processing the data stored in the storage memory 118 and received from storage controller 112 as a first step in processing a database query, thereafter operators in the second stage 404 processing the output of the first stage 402 as a second step in processing the database query, and so on. According to one or more embodiments of the present disclosure, the operations associated with any combination of the stages 402 to 412 may be off-loaded to the storage device 104, rather than being performed by the host device 102. Accordingly, in this case, as shown by arrows having openings with different widths between each of the stages 402 to 412, different sizes of data may be transferred between different components of the storage device 104 to perform the operations associated with the stages. For example, the operations associated with the first stage 402 may be performed by the storage controller 112, and the operations associated with the second to sixth stages 404 to 412 may be performed by the RIC device 116, but the present disclosure is not limited thereto. For example, in another embodiments, all of the operations associated with the first to sixth stages 402 to 412 may be performed by the RIC device 116, or some of the operations (e.g., some of the latency-critical operations) associated with the second to sixth stages 404 to 412 may be performed by the storage controller 112.

As shown in FIG. 4, in the context of the database application, tables of data may typically be stored in the storage device 104 (e.g., the storage memory 118) in a compressed and encrypted format. Thus, one or more operations associated with the first stage 402 may include an operation to decrypt the data. According to an embodiment of the present disclosure, the one or more operations associated with the first stage 402 may be performed by the storage controller 112, for example. As a result, the compressed data may be decrypted by the storage controller 112, and the decrypted compressed data may be transmitted to the RIC device 116 (e.g., via the direct interconnect 118) for further processing. For example, as shown in FIG. 4, the decrypted compressed data may be transmitted from the storage controller 112 to the RIC device 116 at about 3.2 GB/s to about 6.4 GB/s, but the present disclosure is not limited thereto.

The decrypted data may then for instance be parsed to identify desired compressed columns within the tables of the data, and the desired compressed columns of the tables of data may be decompressed during the second stage 404. As an illustrative example, a database query may correspond to operations that "identify all male smokers living in zip code 95134 sorted by age groups" in one or more tables of data stored in the storage device 104, such that a column of the tables of data may correspond to zip code, a column may correspond to gender, a column may correspond to age, a column may correspond to smoker/non-smoker, and/or the like. Thus, one or more operations associated with the second stage 404 may include an operation to parse the stored data format (e.g., which may be a self-describing columnar format in the context of a database application), and an operation to decompress the parsed data (e.g., to decompress the compressed columns corresponding to zip code, gender, age, smoker/non-smoker, and/or the like) using the inverse of the algorithm used to compress the stored data in the first place. Thus for instance if the stored data was compressed using the gzip algorithm then upon reading that compressed data the second stage 404 would accordingly include an operation to decompress the parsed data using the corresponding gunzip decompression algorithm. As a result, as shown by the increase in width of the arrow between the second stage 404 and the third stage 406 in FIG. 4, because compression rates may typically have a factor of 2 to 2.5, a size of the data may be increased from about 3.2 to 6.4 GB/s of the compressed data to about 6.4 to 16 GB/s of the uncompressed data.

The uncompressed data may then be filtered according to one or more conditions defined in the database query. Thus, one or more operations associated with the third stage 406 may include operations to filter the decompressed data according to the conditions defined in the database query. For example, the conditions corresponding to the illustrative database query above may include zip code 95134, gender male, and smoker rather than non-smoker. In this case, for example, the RIC device 116 may select from the columns corresponding to zip code all rows that correspond to 95134, and may then fetch the remaining data of the other columns (e.g., gender, smoker, age, and/or the like) of those matching rows. Then the RIC device 116 may select from the columns corresponding to gender of the matching rows, all rows that correspond to male, and then may fetch the remaining data of the other columns (e.g., smoker/non-smoker, age, and/or the like) of those rows matching zip code 95134 and male. Similarly, the RIC device 116 may select from the columns corresponding to smoker/non-smoker of those matching rows, all rows corresponding to smoker rather than non-smoker, and/or the like, until all filter conditions are applied.

As a result, as shown by the decrease in width of the arrow between the third stage 406 and the fourth stage 408 in FIG. 4, the size of the data may be reduced from the uncompressed data size to a filtered data size. The size of the filtered data may depend on selectivity of the conditions used to filter the data. For example, if the conditions are such that only a few entries of the uncompressed data match from among millions of entries in the uncompressed data, then a size of the resulting filtered data may be substantially smaller than the size of the uncompressed data. As a result, traffic to the host device 102 may be substantially decreased. On the other hand, if the conditions are not very selective such that most of the uncompressed data remains (e.g., is not filtered out), then the size of the filtered data may be substantially the same as that of the uncompressed data. In this case, because the amount of the filtered data is the same or substantially the same as the uncompressed data, acceleration by the storage device 104 may not be very fruitful.

Accordingly, in some embodiments, depending on a selectivity of a data reduction operation (e.g., the filtering operation in the illustration of FIG. 4), control may be passed back to the host device to perform remaining operations when the conditions used to reduce the data (e.g., filter the data) are not very selective. For example, in some embodiments, selectivity of a data reduction operation (e.g., a filtering operation) for a given pipeline workflow may not be known ahead of time (e.g., during a planning stage). In this case, during an execution time (e.g., during a runtime), the selectivity of the data reduction operation that is executing in one or more of the logic blocks may be monitored (e.g., by the host device 102 or by another device or system that is communicably connected to the host device 102, for example, such as a runtime service), and if the reduction in data size is less than a threshold reduction size, then control may be passed back to the host device 102 (e.g., along with the reduced data) such that the host device 102 performs the remaining operations on the data.

After the data has been filtered, in the context of the illustrative database query, the filtered data may be sorted at the fourth stage 408, grouped at the fifth stage 410, and aggregated at the sixth stage 412. For example, the filtered data may be sorted by age at the fourth stage 408, may be grouped into different age groups at the fifth stage 410, and the grouped data may be aggregated at the sixth stage 412. Thus, one or more operations associated with the fourth stage 408 may include operations to sort the filtered data, one or more operations associated with the fifth stage 410 may include operations to group the sorted data, and one or more operations associated with the sixth stage 412 may be to aggregate the grouped data. As shown by the constant widths of the arrows between fourth to sixth stages 408 to 412, sorting and grouping operations do not affect the size of the data but aggregation can potentially reduce the size. The aggregated data may then be transmitted to the host device 102, as shown by the last arrow. Accordingly, a reduction in size of the data processed by the RIC device 116 may depend on the selectivity of the filter conditions during the filtering stage 406, the number of distinct groups formed during the grouping stage 410, and/or the degree to which operations in the aggregation stage 412 summarize the data in each group.

As shown in FIG. 5A, resources needed to statically configure the RIC accelerator 202 with all of the operations associated with the pipeline workflow 400 in FIG. 4 may exceed the amount of available resources on the RIC device 116. For example, in the context of an FPGA, the connections between the gates and flip-flops of the logic blocks (e.g., the static logic blocks 206 and the dynamic logic blocks 208) that configure the operations of the logic blocks may be defined in look-up tables (LUTs), for example, as truth tables. However, the number of LUTs that may be configured in an FPGA at any given time may be limited to a total maximum LUT count of the FPGA. For example, a small FPGA may be limited to a total maximum LUT count of 300K. In this case, the total number of LUTs used by an implementation of the operations of each of the stages 404 to 412 may exceed the total maximum LUT count of the FPGA.

For example, as shown in FIG. 5A, the number of LUTs used for parsing the stored data format (e.g., in the second stage 404) may be about 25K, the number of LUTs used for decompressing the parsed data (e.g., in the second stage 404) may be about 12K, the number of LUTs used for filtering the decompressed data (e.g., in the third stage 406) now flowing at twice the rate of the stored data supposing a compression factor of 2 may be much larger (e.g., 90K), the number of LUTs used for sorting the reduced data (e.g., in the fourth stage 408, assuming that 90% of the data is filtered out for illustration) may be about 100K, and the number of LUTs used to group and aggregate the data (e.g., in the fifth stage 410 and the sixth stage 412) may be about 100K (e.g., assuming that the data falls into 10 groups for illustration). In this comparative example, the total number of LUTs that are used to process the data according to the pipeline workflow 400 of FIG. 4 is 327K, which exceeds the total maximum LUT count on the FPGA (e.g., 300K in this illustrative example). Thus, all of the operations associated with the pipeline workflow 400 may not fit the FPGA resources concurrently (e.g., simultaneously or at the same time), and thus, may not be statically configured on the FPGA all at once. In this case, the number of operations associated with the pipeline workflow 400 that may be off-loaded to the FPGA may be reduced or limited according to the available resources of the FPGA.

On the other hand, as shown in FIG. 5B, when at least some of the operations of the pipeline workflow 400 are dynamically configured when needed or desired, then the operations associated with the pipeline workflow 400 may be offloaded to the FPGA. For example, if the operations 502 associated with the parsing, the decompressing, and the filtering stages (e.g., the second stage 404 and the third stage 406) are statically configured, and the other remaining operations 504 and 506 associated with the sorting, grouping, and aggregating stages (e.g., the fourth stage 408, the fifth stage 410, and the sixth stage 412) are dynamically reconfigured as needed or desired, then the maximum number of LUTs used at any time may be 227K (e.g., 127K for the statically configured logic blocks and 100K for the dynamically configured logic blocks). Accordingly, the number of operations that may be off-loaded to the FPGA may be increased when at least some of the operations are dynamically configured as needed or desired.

In some embodiments, a reconfiguration time of the dynamic logic blocks may be reduced (e.g., to about 1 ms), because the configuration files may be stored in the config buffer 306 (e.g., see FIG. 3) for quick retrieval when needed or desired. In this case, when a different operation is to be performed by one of the dynamic logic blocks 208, a corresponding configuration file may be loaded therein from the config buffer 306, such that the dynamic logic block may be reconfigured within 1 ms. However, even in this case, there may be latency-critical operations that may be unable to tolerate the amount of time it takes to reconfigure the dynamic logic blocks. Accordingly, in some embodiments, the operations in the pipeline workflow corresponding to latency-critical operations may be configured in the static logic blocks, such that the reconfiguration time is not added to those operations, and the dynamic logic blocks may be configured with other operations (e.g., throughput-oriented operations) of the pipeline workflow that may be able to tolerate the time it takes to reconfigure the dynamic logic blocks, such that utilization of the resources of the RIC device 116 may be improved. However the present disclosure is not limited thereto. For example, as discussed with reference to FIGS. 6A and 6B, in some embodiments, the dynamic logic blocks may be reconfigured while other logic operations are being executed, such that the reconfiguration time of the dynamic logic blocks may be hidden.

Figure 6A:
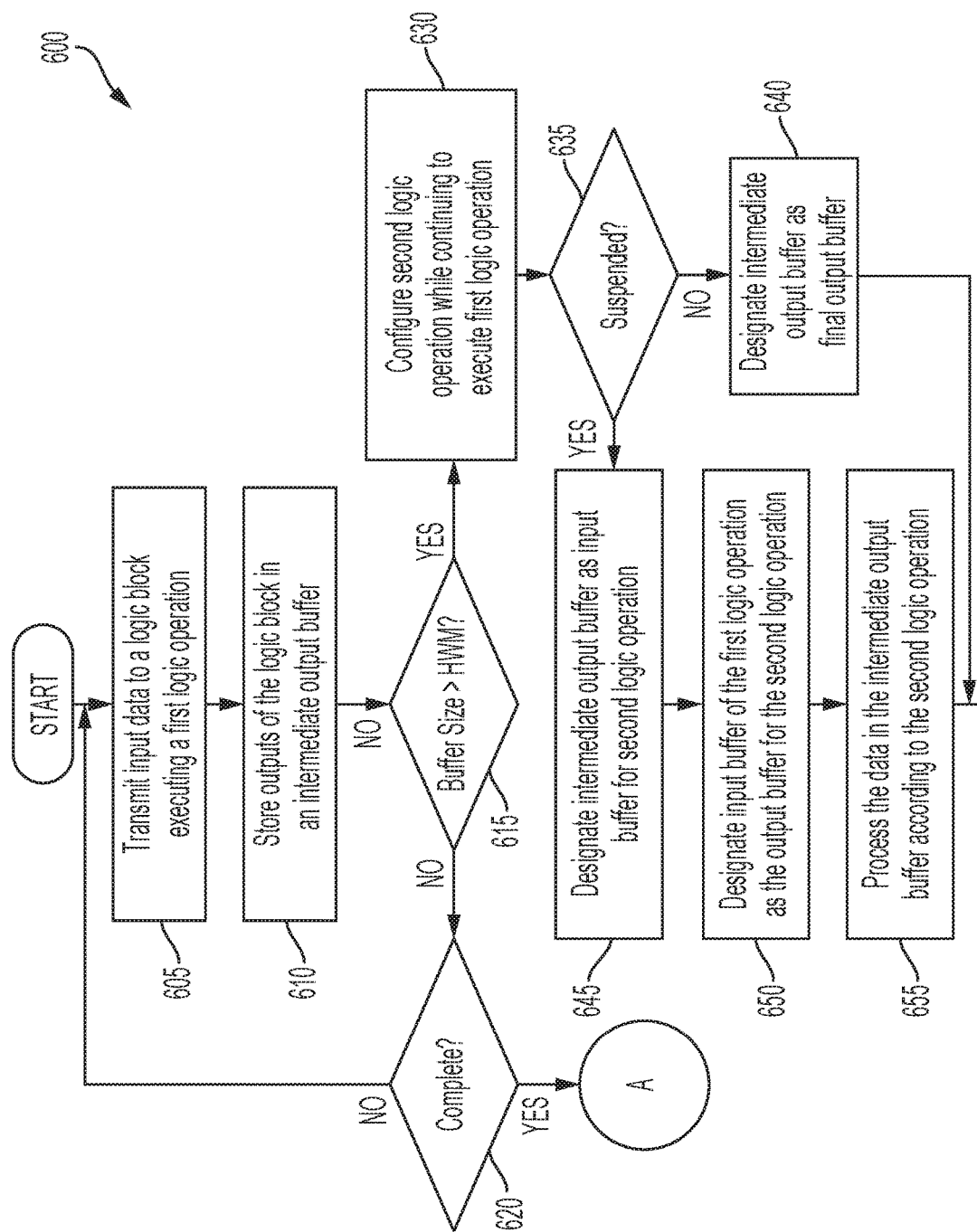
FIGS. 6A and 6B illustrate a method of accelerating data-intensive operations by a storage device, according to one or more example embodiments of the present disclosure.
Figure 6B:
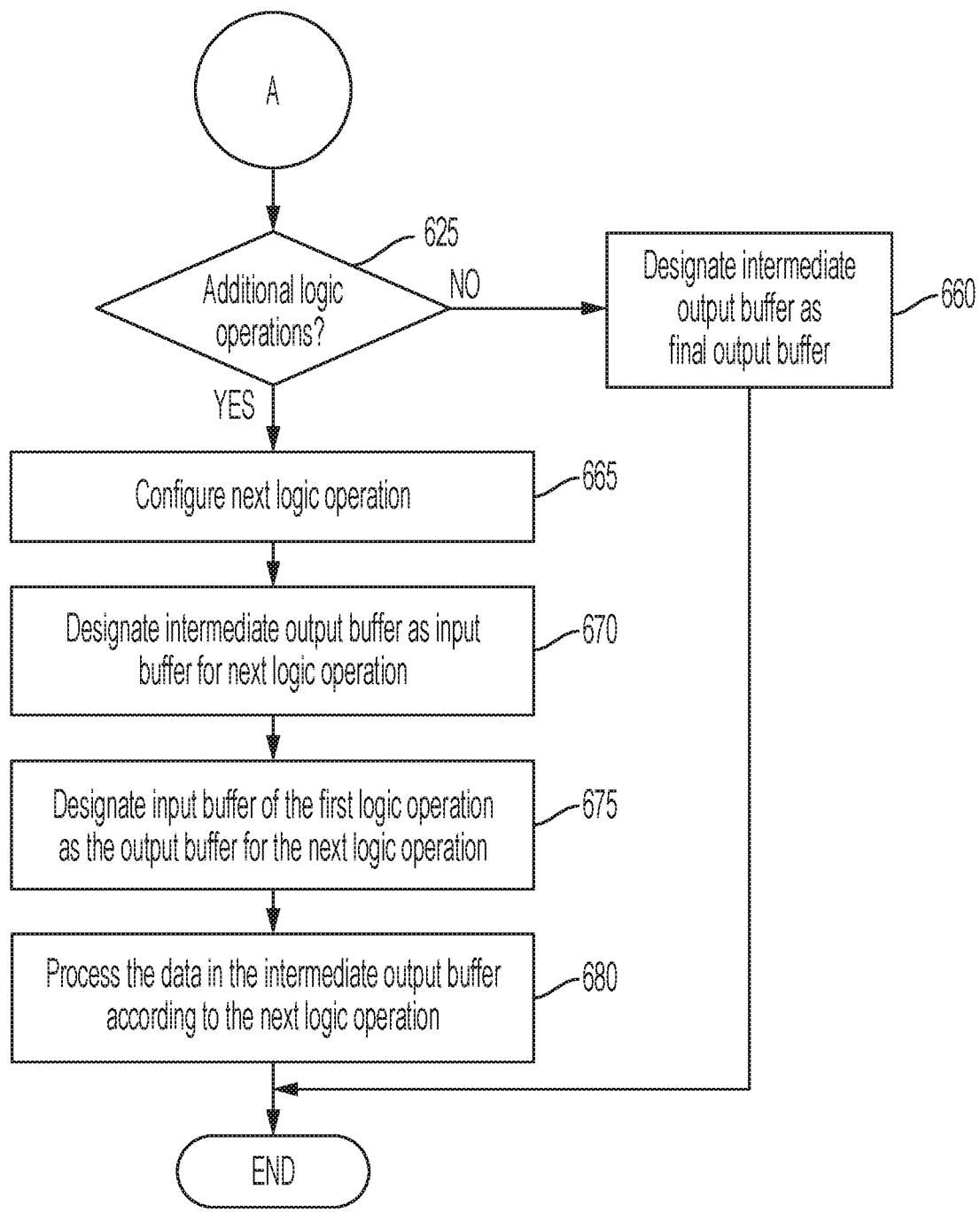

FIGS. 6A and 6B illustrate a method 600 of accelerating data-intensive operations by a storage device, according to one or more example embodiments of the present disclosure. However, the present disclosure is not limited to the sequence or number of the operations of the method 600 shown in FIGS. 6A and 6B, and can be altered into any desired sequence or number of operations as recognized by a person having ordinary skill in the art. For example, in some embodiments, the order may vary, or the method may include fewer or additional operations.

Referring to FIGS. 6A and 6B, the method starts when one or more commands are received by the storage device 104 from the host device 102 to process data stored in the storage memory 114 (e.g., see FIG. 1). The commands may be associated with a particular pipeline workflow, such that the pipeline workflow may be divided into a plurality of stages, each of the stages corresponding to one or more data-intensive operations associated with the commands. For each of the stages, one or more logic operations may be dynamically configured in the dynamic logic blocks 208 of the RIC device 116 (e.g., see FIG. 2) to execute the operations. For example, a first logic operation may be configured in a logic block (e.g., a dynamic logic block), and input data (e.g., stored in the storage memory 114) may be transmitted into the logic block actively executing the first logic operation at operation 605. The logic block may be configured to store outputs thereof in an intermediate output buffer (e.g., the intermediate I/O buffer 304 in FIG. 3) at operation 610.

As the outputs of the logic block fill the intermediate output buffer, the intermediate output buffer is monitored to determine whether a threshold (e.g. a high water mark (HWM)) is reached at operation 615. If the HWM is not hit at operation 615 (e.g., NO), then it is determined whether the first logic operation has completed at operation 620. If the first logic operation has not completed at operation 620 (e.g., NO), then the first logic operation continues to execute until the HWM is reached at operation 615 or the first logic operation has completed at operation 620. On the other hand, if the first logic operation has completed at operation 620 (e.g., YES), then the process continues (A) at operation 625, which will be discussed with reference to FIG. 6B below.

If the HWM is reached at operation 615 (e.g., YES), then a second logic operation is configured (e.g., in a second dynamic logic block) while the first logic operation continues to execute at operation 630. In this case, for example, the reconfiguration time of the second logic operation in the second logic block may be hidden (e.g., may be inconsequential), because the first logic operation continues to be executed while the second logic operation is being configured. In this case, in some embodiments, the second logic operation may be an extension of the first operation. The method 600 may work best when the first logic operation and the second logic operation form a throughput-oriented pipeline (e.g., a minimal version of the pipeline workflow 400), but the present disclosure is not limited thereto.

The first logic operation continues to be executed until it reaches the end of the intermediate output (e.g., the intermediate output buffer is full) in which case it is suspended, or the first logic operation runs out of the input data in which case it is deemed completed. Accordingly, it is determined whether the first logic operation is suspended at operation 635. If the first logic operation is not suspended at operation 635 (e.g., NO), then the first logic operation runs to completion, in which case, the intermediate output buffer of the first logic operation is designated as a final output buffer at operation 640. The data stored in the final output buffer may be transmitted to the host device 102.

On the other hand, if the first logic operation is suspended at operation 635 (e.g., YES), then the intermediate output buffer of the first logic operation is designated as an input buffer for the second logic operation at operation 645, and the input buffer of the first logic operation is designated as the output buffer for the second logic operation at operation 650. The data in the intermediate output buffer (which is now designated as the input buffer for the second logic operation) is processed according to the second logic operation at operation 655. The method 600 may repeat until no inputs remain, and the entire pipeline workflow of operations are performed on all the inputs.

Referring to FIG. 6B, if the first logic operation has completed at operation 620 (e.g., YES), then the process continues (A) at operation 625, where it is determined whether there are any additional logic operations in the pipeline workflow to configure. If there are no additional logic operations to configure for the pipeline workflow at operation 625 (e.g., NO), then the intermediate output buffer of the first logic operation is designated as a final output buffer at operation 660. The data stored in the final output buffer may be transmitted to the host device 102.

On the other hand, if there are additional logic operations to configure for the pipeline workflow at operation 625 (e.g., YES), then the next logic operation is configured (e.g., in a second logic block) at operation 665. The intermediate output buffer of the first logic operation is designated as an input buffer for the next logic operation at operation 670, and the input buffer of the first logic operation is designated as the output buffer for the next logic operation at operation 675. The data in the intermediate output buffer (which is now designated as the input buffer for the next logic operation) is processed according to the next logic operation at operation 680, and the method 600 may repeat until no inputs remain, and the entire pipeline workflow of operations are performed on all the inputs.

Although some example embodiments have been described with reference to the accompanying drawings, the present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Thus, description of aspects and features within each example embodiment should typically be considered as available for other similar aspects and features in other example embodiments, unless otherwise specified.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While FIGS. 1-3 show an example packaging, it will be evident to one skilled in the art that various functions and components may be arranged in other suitable ways by application of semiconductor packaging, printed circuit board design, integrated circuit design, system design, and design of racks or clusters of systems as well, depending on the number of components used or necessary for processing data at scale.

Furthermore, any of the interconnects shown in FIGS. 1-3 may be replaced by any suitable wired or wireless connections ranging from as simple as conductive or optical linkage inside an integrated circuit, to through silicon vias or other non-silicon optical, inductive, conductive, or capacitive linkages between dies, packages or chiplets, to printed circuit board traces, wire bonds, switched or direct cables or wires between chips, packages and/or systems, or as complex as entire data center scale or rack scale fabrics.

The inventive concepts of FIGS. 1-3 may be applied to systems of any suitable scale, ranging from single core host processor to multicore host processors, from single channel of host memory to multiple channels each containing multiple devices such as DIMMs, from single host to hundreds of thousands or more, from one storage device to many in each host or on a fabric attached to many hosts, from devices with one storage controller to those containing several controllers, from those containing one RIC device to those containing many perhaps of several different varieties.

Accordingly, although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
a storage controller configured to receive data from a host device, and to store the data in storage memory; and
a reconfigurable integrated circuit communicably connected to the storage controller, and configured to accelerate logic operations executed on the data stored in the storage memory, the reconfigurable integrated circuit comprising:
a first logic block configured to execute a static logic operation from among the logic operations corresponding to a first pipeline workflow;
a second logic block configured to execute one or more dynamic logic operations from among the logic operations corresponding to the first pipeline workflow; and
a plurality of memory buffers configured to store inputs and outputs of the first and second logic blocks,
wherein the static logic operation is an operation from among the logic operations of the first pipeline workflow having a completion time less than a reconfiguration time of the second logic block, and the first logic block is configured to be reconfigured to execute a different logic operation for a second pipeline workflow, and
wherein the second logic block is configured to be reconfigured to execute different ones of the one or more dynamic logic operations for different stages of the first pipeline workflow based on an amount of resources consumed by the different ones of the one or more dynamic logic operations and available resources allocated for the second logic block in the different stages.

2. The storage device of claim 1, wherein the first logic block is configured to be statically configured with the static logic operation for a duration of the first pipeline workflow, and the second logic block is configured to be dynamically reconfigured with the one or more dynamic logic operations for at least one stage of the first pipeline workflow.

3. The storage device of claim 2, wherein the one or more dynamic logic operations comprises a first dynamic logic operation and a second dynamic logic operation, the second logic block is configured with the first dynamic logic operation during a first stage of the first pipeline workflow, and the second logic block is dynamically reconfigured with the second dynamic logic operation during a second stage of the first pipeline workflow.

4. The storage device of claim 1, wherein the plurality of memory buffers comprises:
an input/output (I/O) buffer configured to store the inputs and the outputs of the first and second logic blocks;
an intermediate I/O buffer configured to store intermediate outputs of the second logic block while the second logic block is being reconfigured; and
a configuration buffer configured to store configuration files to reconfigure the second logic block.

5. The storage device of claim 4, wherein the second logic block is dynamically reconfigured by loading a configuration file from among the configuration files stored in the configuration buffer to the second logic block.

6. The storage device of claim 4, wherein outputs of the second logic block is stored in the intermediate I/O buffer during a first stage, the second logic block is reconfigured with a different dynamic logic instruction for a second stage, and the intermediate I/O buffer is designated as the input buffer of the second logic block during the second stage.

7. The storage device of claim 1, wherein the static logic operation corresponds to a latency-critical operation, and the one or more dynamic logic operations correspond to a throughput-oriented operation.

8. The storage device of claim 1, wherein the storage device is a solid-state drive.

9. The storage device of claim 8, wherein the reconfigurable integrated circuit is a field programmable gate array (FPGA).

10. A method for accelerating operations in a storage device comprising a storage controller, storage memory, and a reconfigurable integrated circuit comprising a first logic block, a second logic block, and a buffer, the method comprising:
executing, by the first logic block, a first logic operation on input data stored in the storage memory;
storing, by the first logic block, outputs of the first logic operation in an intermediate output buffer of the buffer;
configuring, by the reconfigurable integrated circuit, a second logic operation in the second logic block;
designating, by the reconfigurable integrated circuit, the intermediate output buffer as an input buffer for the second logic operation;
designating, by the reconfigurable integrated circuit, an input buffer of the first logic operation as an output buffer for the second logic operation; and
executing, by the second logic block, the second logic operation on the outputs of the first logic operation stored in the intermediate output buffer,
wherein the first logic operation is an operation having a completion time less than a reconfiguration time of the second logic block, and the first logic block is configured to be reconfigured to execute different logic operations for different pipeline workflows.

11. The method of claim 10, wherein the second logic operation is configured in the second logic block while the first logic operation is executing in the first logic block.

12. The method of claim 11, wherein the configuring of the second logic operation in the second logic block comprises:
monitoring a value of the intermediate output buffer;
determining that the value exceeds a threshold value; and
configuring the second logic operation in the second logic block in response to the value exceeding the threshold value.

13. The method of claim 12, wherein the threshold value is a high water mark of the intermediate output buffer.

14. The method of claim 11, wherein the buffer comprises a configuration buffer configured to store configuration files for configuring the second logic block.

15. The method of claim 14, wherein the configuring of the second logic operation in the second logic block comprises:
loading a bit file corresponding to the second logic operation from among the configuration files stored in the configuration buffer into the second logic block.

16. A method for accelerating operations in a storage device comprising a storage controller, storage memory, and a reconfigurable integrated circuit comprising a first logic block, a second logic block, and a buffer, the method comprising:
executing, by the first logic block, a first logic operation on input data stored in the storage memory;

storing, by the first logic block, outputs of the first logic operation in an intermediate output buffer of the buffer;

configuring, by the reconfigurable integrated circuit, a second logic operation in the second logic block;

designating, by the reconfigurable integrated circuit, the intermediate output buffer as an input buffer for the second logic operation; and executing, by the second logic block, the second logic operation on the outputs of the first logic operation stored in the intermediate output buffer, wherein the designating of the intermediate output buffer as the input buffer for the second logic operation comprises:

determining whether the first logic operation is suspended;

designating the intermediate output buffer as the input buffer for the second logic operation in response to determining that the first logic operation is suspended; and designating an input buffer of the first logic operation as an output buffer for the second logic operation.

17. The method of claim 16, wherein the determining whether the first logic operation is suspended comprises:

determining whether an end of the intermediate output buffer is reached.

18. The method of claim 10, further comprising:

determining that the second logic block has processed all of the outputs of the first logic operation stored in the intermediate output buffer; and designating an output buffer of the second logic operation as a final output buffer.

19. The method of claim 10, wherein the storage device is a solid state drive, and the reconfigurable integrated circuit is a field programmable gate array (FPGA).

20. The storage device of claim 1, wherein the one or more dynamic logic operations comprise a first dynamic logic operation and a second dynamic logic operation from among the logic operations corresponding to the first pipeline workflow, and a total amount of resources consumed by the first dynamic logic operation and the second dynamic logic operation exceeds an amount of the available resources allocated for the second logic block in the different stages.

* * * * *